(12) United States Patent
Miura et al.

(10) Patent No.: US 8,550,582 B2
(45) Date of Patent: Oct. 8, 2013

(54) LIQUID EJECTION CONTROL DEVICE, LIQUID EJECTION DEVICE, AND LIQUID EJECTION CONTROL METHOD

(75) Inventors: Hirotsuna Miura, Nagano (JP); Hayato Takahashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 13/013,162

(22) Filed: Jan. 25, 2011

(65) Prior Publication Data

US 2011/0181642 A1 Jul. 28, 2011

(30) Foreign Application Priority Data

Jan. 28, 2010 (JP) ................................ 2010-016881

(51) Int. Cl.
*B41J 29/38* (2006.01)
*B41J 2/015* (2006.01)

(52) U.S. Cl.
USPC ................................................ 347/9; 347/20

(58) Field of Classification Search
USPC ............................................................. 347/9
See application file for complete search history.

(56) References Cited

U.S. PATENT DOCUMENTS 7,121,660 B2 * 10/2006 Ide et al. ...................... 347/101
7,311,379 B2 12/2007 Mitsuzawa

FOREIGN PATENT DOCUMENTS

JP 2004-025551 A 1/2004

* cited by examiner

*Primary Examiner* — Uyen Chau N Le
*Assistant Examiner* — Kajli Prince
(74) *Attorney, Agent, or Firm* — Global IP Counselors, LLP

(57) ABSTRACT

A printer includes an intermediate buffer that holds plain data produced by subjecting print data to extraction processing and microweave processing, and a control buffer that holds head control data produced by subjecting plain data to vertical-horizontal conversion processing. The control buffer is allocated storage capacity that allows it to hold data equivalent to one impression and data equivalent to one-fourth an impression (one pass in printing at four passes per impression).

13 Claims, 7 Drawing Sheets

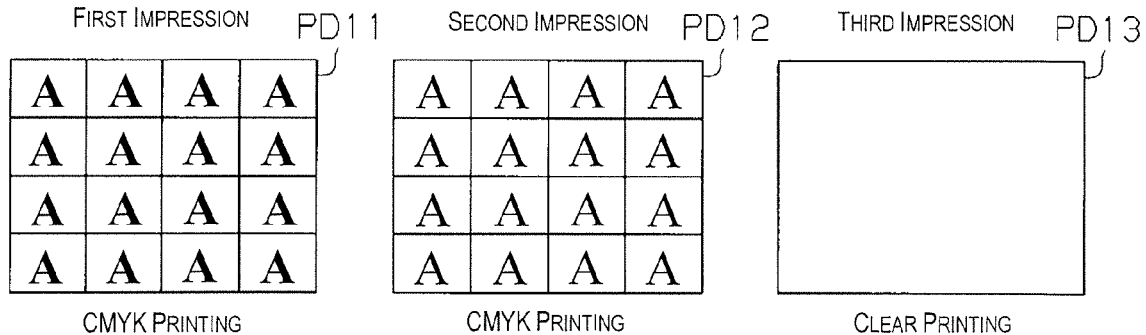
Fig. 8A  Fig. 8B
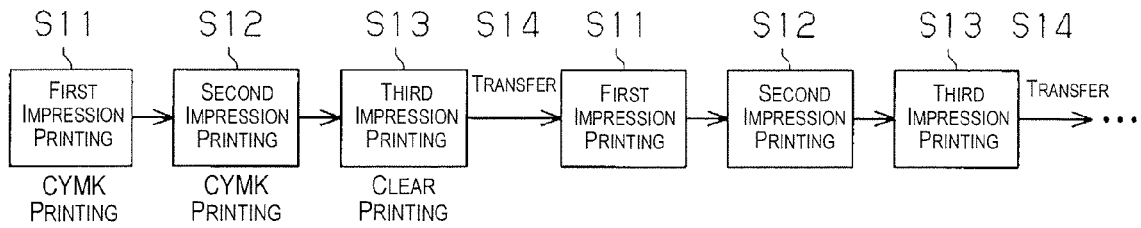
Fig. 9
Fig. 10

US 8,550,582 B2

LIQUID EJECTION CONTROL DEVICE, LIQUID EJECTION DEVICE, AND LIQUID EJECTION CONTROL METHOD

CROSS-REFERENCE TO RELATED APPLICATIONS

This application claims priority to Japanese Patent Application No. 2010-016881 filed on Jan. 28, 2010. The entire disclosure of Japanese Patent Application No. 2010-016881 is hereby incorporated herein by reference.

BACKGROUND

1. Technical Field

The present invention relates to a liquid ejection control device, a liquid ejection device, and a liquid ejection control method.

2. Related Art

Japanese Laid-Open Patent Application 2004-25551, for example, discloses a printing device equipped with a plurality of recording heads (the liquid ejection unit) for ejecting out ink. With this printing device, a plurality of print heads and drive controllers (head drive circuit) provided corresponding to these print heads are installed on a carriage. The main body of the printing device is provided with a plurality of data processors (image processors; processing unit) for transferring data to the drive controllers. The data processors subject print data received by the printing device to processing, and perform data processing that produces head control data that can be used by the recording heads.

With printing devices, such as serial printers or lateral printers, it is known that a carriage is moved a plurality of times (a plurality of passes) in a direction that intersects the conveyance direction of the paper or other such target, while ink droplets are ejected from the nozzles of the moving recording heads, thereby printing an image on the target. In this case, nozzle rows, in which a plurality of nozzles (such as 180 or 360) that are perpendicular to the reciprocal movement direction of nozzle formation faces of the recording heads (faces that are opposite the target) are arranged at a specific pitch, are formed for each color.

With this type of printing device, print data is sequentially received as a packet (compressed data) from a host device, and the received print data is successively stored in a reception buffer. The data processors extract the print data and separate the print image data and commands included therein, analyze the commands, and successively store the print image data in an intermediate buffer. The data processors perform, for example, vertical-horizontal conversion processing in which the arrangement order of the pixels of print image data (data read order) is converted from a horizontal arrangement order used for display into a vertical (nozzle row direction) arrangement order that matches the ejection order in which the ink droplets are ejected from the recording heads, to produce head control data (head image data), which is stored in a print buffer. Then, the head control data is successively transferred, one pass at a time, from the print buffer to the recording heads, and drive circuits within the recording heads perform ejection control in which ink droplets are ejected out of the nozzle rows based on the head control data, thereby printing an image. With a line printer, the only difference is that there is no vertical-horizontal conversion processing, and the data for each processing stage is successively stored in each buffer by the same flow.

SUMMARY

There are situations in which a single image composed of a plurality of impressions is formed on a target by printing images over each other for each impression. For example, in the case of clear printing, solid printing is performed with a clear ink over the image made in a first printing impression, in order to give the image a gloss, and there is also a situation printing is performed by layering a plurality of impressions of the images themselves.

Since this image data used for printing a plurality of impressions of images includes image data for a plurality of impressions, if the storage capacity of a buffer is determined by assuming the maximum number of impressions, then there will be wasted space in the buffer when printing is performed based on image data with a small number of impressions.

On the other hand, if there is only enough storage capacity for one ordinary image that does not comprise a plurality of impressions, then when a plurality of jobs (sheets) are printed, the image data will have to be transferred from the host device to the printing device every time one sheet (one page) is printed with the printing device. However, the transfer of data from the host device to the printing device is usually carried out by serial communication such as USB communication, and this data transfer becomes the rate-limiting factor, which ends up lowering the print processing speed.

The present invention was conceived in light of the above problem, and it is an object thereof to provide a liquid ejection control device, a liquid ejection device, and a liquid ejection control method with which the time lag in liquid ejection processing of the liquid ejection unit attributable to a delay in data transfer or data processing can be shortened as much as possible even when printing a plurality of images based on image data received by the liquid ejection device.

In order to achieve the above stated object, a liquid ejection control device according to a first aspect of the present invention is adapted to form a single image including a plurality of impressions by ejecting liquid and superposing a plurality of images respectively corresponding to the impressions. The liquid ejection control device includes an input unit, an input buffer, a processing unit, an output buffer and a liquid ejection unit. The input unit is configured to input image data. The input buffer is configured to store first image data inputted by the input unit, the first image data including the plurality of impressions. The processing unit is configured to produce second image data by subjecting the first image data to processing. The output buffer is configured to store the second image data. The liquid ejection unit is configured to eject the liquid so as to superpose the images respectively corresponding to the plurality of impressions on a target based on the second image data. The output buffer has a storage capacity that is capable of holding image data equivalent to at least two impressions out of the plurality of impressions.

With this invention, the processing unit processes the image data inputted by the input unit and held in the input buffer, and after this processing, the second image data is held in the output buffer. This output buffer can hold image data equivalent to at least two impressions out of the image data inputted at a single time by the input unit (a plurality of impressions). Thus, when two or fewer impressions are needed to form one image, the second image data held in the output buffer is used, and image formation can be repeated a plurality of times. For example, even if the data input rate of the input unit is relatively slow, as long as there is input one time at first, the image data stored in the output buffer can be used to form the second and subsequent images, so it is less likely that the data input rate of the input unit will be the rate determining factor and there will be a waiting time until the next image formation can be commenced, which would otherwise slow down the formation speed for each image so that forming a plurality of images would take more time. Also, with a constitution in which a single image formation involves three or more impressions, when image formation is being performed for one of those impressions, the image data for the other impressions can be inputted by the input unit in parallel with this processing, so there is no waiting time until the image formation of the next impression.

In the liquid ejection control device as described above, the liquid ejection unit is preferably configured to form an image of one impression by moving relative to the target by N passes, where N is a natural number (N≥2), and the output buffer preferably has the storage capacity that is capable of holding the second image data in an amount equivalent to a set number of passes that is at least (N+1) and less than 2N.

With this invention, since the output buffer can store one pass of second image data for one impression and one pass of second image data for the next impression, the formation of the image of the next impression (equivalent to one pass) can be started with almost no waiting time after the formation of the first impression image.

In the liquid ejection control device as described above, the image data preferably includes first impression image data in which one impression of data is formed by relative movement of the liquid ejection unit by N passes with respect to the target, and second impression image data which is an amount of data equivalent to M passes of the first impression image data (where M is a natural number; 1≤M<N), and the output buffer preferably has a storage capacity that is capable of holding the second image data equivalent to (N+M) passes.

With this invention, since the output buffer can hold first image data equivalent to N passes and second image data equivalent to M passes, the formation of the image of the next impression can be started with almost no waiting time after the formation of the first impression image.

In the liquid ejection control device as described above, the second impression image data preferably has a data volume equivalent to one pass of the first impression image data, and is image data of an impression for clear ejection processing in which a transparent liquid is ejected. The output buffer preferably has a storage capacity that is capable of holding the second image data equivalent to (N+1) passes of the first impression image data.

With this invention, since the output buffer can hold second image data equivalent to one impression and second image data equivalent to one pass of the next impression, the formation of the image of the next impression image (equivalent to one pass) can be started with almost no waiting time after the formation of the first impression image.

The liquid ejection control device as described above preferably further includes an allocation unit configured to dynamically allocate the storage capacity of the buffer. With this invention, since the storage capacity of the buffer can be dynamically allocated by the allocation unit, the storage areas of the buffers can be used more effectively.

In the liquid ejection control device as described above, when, in the course of switching the image formed by liquid ejection of the liquid ejection unit, formation of the last image prior to the switch ends and results in a blank pass in the output buffer, the allocation unit preferably allocates the blank pass to a buffer located upstream in a data flow direction with respect to the output buffer.

With this invention, if the formation of the last image ends before switching to the output buffer in the course of switching the image formed by liquid ejection, and a blank pass results, that blank portion is allocated to the buffer located upstream in the data flow direction with respect to the output buffer. Thus, processing of the next image data performed using a buffer upstream of the output buffer can proceed during the formation of the last image to undergo the current liquid ejection processing. As a result, formation of the next image can be quickly started after formation of all of the current images has ended.

In the liquid ejection control device as described above, the processing unit preferably includes a first processing unit configured to produce plain data by performing first processing in which extraction processing and/or command analysis is performed as the processing, and a second processing unit configured to produce the second image data by performing second processing including vertical-horizontal conversion processing on the plain data. The intermediate buffer is preferably provided to the liquid ejection control device to hold the plain data that has undergone the first processing by the first processing unit. The intermediate buffer preferably has a storage capacity equivalent to at least two impressions.

With this invention, since the intermediate buffer can store plain data equivalent to two or more impressions, the plain data can be repeatedly used to form a plurality of images merely by performing second processing on the plain data held in the internal intermediate buffer, without inputting image data via the input unit.

In the liquid ejection control device as described above, the input unit is preferably configured to input image data and commands, and two of the input units are preferably provided. The processing unit is preferably configured to process image data and commands inputted by the input unit, and two of the processing units are preferably provided corresponding to the input units. Two control units are preferably provided, each having the input unit, the processing unit, the input buffer, and the output buffer. The two control units preferably share control of the liquid ejection unit, and output commands to a drive control units to control drive of a mechanical component, with one of the control units being synchronized with the other. With this invention, since two control units share the control over a plurality of the liquid ejection unit, the processing load borne by each control units can be lightened.

A liquid ejection device according to another aspect of the present invention includes the liquid ejection control device as described above, a movement unit configured to relatively move the liquid ejection unit and the target, and a drive control unit configured to control the movement unit. The same action and effect can be obtained with this aspect as with the liquid ejection control device as described above.

A liquid ejection control method according to another aspect includes: holding in an input buffer first image data inputted by an input unit; subjecting the first image data held in the input buffer to processing to produce second image data, and holding the second image data in an output buffer; and forming an image by layering a plurality of impressions by ejecting liquid onto a target with a liquid ejection unit based on the second image data held in the output buffer. The output buffer has a storage capacity that is capable of holding image data equivalent to at least two out of the plurality of impressions. The same action and effect can be obtained with this invention as with the liquid ejection control device of the above inventions.

BRIEF DESCRIPTION OF THE DRAWINGS

Referring now to the attached drawings which form a part of this original disclosure:

FIG. 8A is a schematic view of the data holding state of a print buffer in the case of four passes per impression, and FIG. 8B in the case of eight passes per impression;

FIG. 9 is a schematic view of impression image data for three-impression printing;

FIG. 10 is a schematic view illustrating the procedure in three-impression printing.

DETAILED DESCRIPTION OF EXEMPLARY EMBODIMENTS

An embodiment of the present invention, which is embodied by a printing control device for a lateral inkjet printer will now be described through reference to FIGS. 1 to 11.

Figure 1:
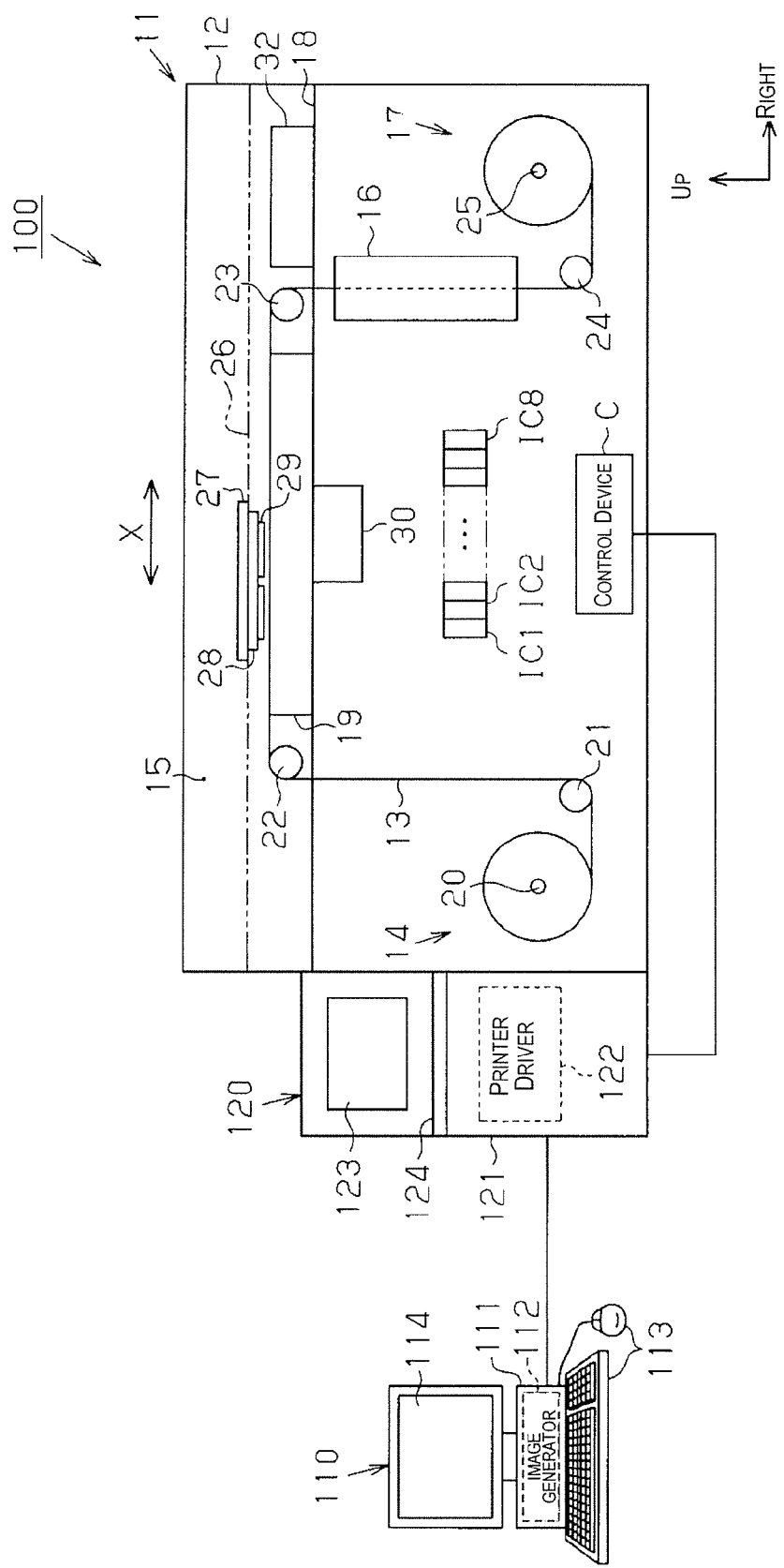
FIG. 1 is a schematic side view of a printing system in an embodiment.

FIG. 1 is a schematic side view of a printing system comprising a lateral inkjet printer. As shown in FIG. 1, a printing system 100 comprises an image production device 110 that produces image data, a host device 120 that produces print data based on image data received from the image production device 110, and a lateral inkjet printer 11 (hereinafter referred to simply as the "printer 11"), as a printing device that prints images based on print data received from the host device 120.

The image generation device 110 is constituted by a personal computer, for example, and comprises an image generator 112 constructed by the execution of image production software by a CPU in the main body 111 of the image generation device 110. The user starts up the image generator 112, produces an image on a monitor 114 by operating an input device 113, and directs the printing of the image by operating the input device 113. As a result, image data pertaining to that image is sent to the host device 120 via a specific communication interface.

The host device 120 is constituted by a personal computer, for example, and comprises a printer driver 122 constructed by the execution of printer driver software by a CPU in the main body 121 of the host device 120. The printer driver 122 generates print data based on the image data received from the image generation device 110, and sends it to a control device C provided to the printer 11. The control device C controls the printer 11 based on print data received from the printer driver 122, and causes the printer 11 to print an image based on the print data. A menu screen for inputting and setting control settings to the printer 11, an image of what is to be printed, or the like is displayed on a monitor 123.

Next, the configuration of the lateral inkjet printer in FIG. 1 will be described. In the descriptions in this Specification that follow, the terms "left and right direction" and "up and down direction" use as a reference the directions indicated by arrows in FIG. 1 and other drawings. In FIG. 1, the side closer to the viewer is called the front side, and the side farther away is called the rear side.

As shown in FIG. 1, the printer 11 comprises a cuboid main body case 12. Provided inside the main body case 12 are a play-out component 14 that plays out a long sheet 13, a printing chamber 15 in which printing is performed by ejecting ink onto this sheet 13, a drying apparatus 16 that dries the sheet 13 to which ink has adhered in this printing, and a winder 17 that winds up the sheet 13 that has undergone drying.

A flat base 18 that divides the inside of the main body case 12 into upper and lower segments is provided somewhat toward the top in the main body case 12, and the region above this base 18 serves as the printing chamber 15, in which a rectangular platen 19 is supported on the base 18. In the region that is below the base 18, the play-out component 14 is disposed at a position that is toward the left side and upstream in the conveyance direction of the sheet 13, and the drying apparatus 16 and the winder 17 are disposed at positions toward the right side and on the downstream side.

As shown in FIG. 1, a winding shaft 20 extending in the longitudinal direction is rotatably provided to the play-out component 14, and the sheet 13 is supported on this winding shaft 20 so as to be integrally rotatable in a state of being pre-wound into a roll. Specifically, the sheet 13 is played out from the play-out component 14 by the rotation of the winding shaft 20. The sheet 13 that has been played out from the play-out component 14 is wound onto a first roller 21 located to the right of the winding shaft 20, and is guided upward.

Meanwhile, a second roller 22 is provided in a state of being parallel to the first roller 21, at a position corresponding in the up and down direction to the lower first roller 21 that is to the left of the platen 19. After its conveyance direction has been changed to the vertical upward direction by the first roller 21, the sheet 13 is wound from below and on the left side of the second roller 22, which changes its conveyance direction to the horizontal direction (to the right) and causes it to slide over the upper face of the platen 19.

A third roller 23 that is opposite the second roller 22 with the platen 19 in between is provided in a state of being parallel to the second roller 22, on the right side of the platen 19. The positions of the second roller 22 and the third roller 23 are adjusted so that the tops of their peripheral faces are at the same height as the upper face of the platen 19.

After its conveyance direction has been changed to the horizontal direction (to the right) by the second roller 22 on the left side within the printing chamber 15, the sheet 13 is conveyed to the right (the downstream side) while sliding over the top of the platen 19, after which it is wound from above and on the right side of the third roller 23, which changes the conveyance direction to the vertical downward direction, so that the sheet 13 is conveyed toward the drying apparatus 16, which is lower than the base 18. After being dried by passing through the drying apparatus 16, the sheet 13 is conveyed farther in the vertical downward direction, after which it is wound onto a fourth roller 24, which changes the conveyance direction to the horizontal direction (to the right), and the sheet 13 is wound into a roll shape by the rotation of a winding shaft 25 disposed to the right of the fourth roller 24, under the drive force of a conveyance motor 61 (see FIG. 4).

As shown in FIG. 1, a pair of guide rails 26 (indicated by a two-dot chain line in FIG. 1) extending to the left and right are provided on both sides in front and back of the platen 19 in the printing chamber 15. The upper faces of the guide rails 26 are higher than the upper face of the platen 19, and support a rectangular carriage 27 in a state in which reciprocal motion is possible in a main scanning direction X (the left and right direction in FIG. 1) along the guide rails 26 under the drive of CR motors 62 and 63 (see FIG. 4). A plurality of recording heads 29 are supported via a support plate 28 on the lower face side of this carriage 27.

A specific range from the left end to the right end of the platen 19 serves as the printing region, and the sheet 13 is conveyed intermittently in units of this printing region. The sheet 13 is printed by ejecting ink from the recording heads 29 as the carriage 27 moves back and forth with respect to the sheet 13 that is stopped on the platen 19.

During printing, a suction apparatus 30 provided on the lower side of the platen 19 is driven, and the sheet 13 is held against the upper face of the platen 19 by the attractive force produced by negative pressure at numerous suction holes formed in the upper face of the platen 19. Once a single print job has been completed on the sheet 13, the negative pressure of the suction apparatus 30 is released, and the sheet 13 is conveyed away.

Inside the printing chamber 15, a maintenance apparatus 32 for servicing the recording heads 29 when printing is not in progress is provided in the non-printing region to the right of the third roller 23.

As shown in FIG. 1, a plurality of (such as eight) ink cartridges IC1 to IC8, which hold different colors of ink, are removably mounted inside the main body case 12. The ink cartridges IC1 to IC8 are connected to the recording heads 29 through ink supply tubes (not shown), and the recording heads 29 eject ink supplied from the ink cartridges IC1 to IC8. Accordingly, with the printer 11 in this example, color printing is possible by using eight colors of ink.

The eight ink cartridges IC1 to IC8 hold ink that is black (K), cyan (C), magenta (M), yellow (Y), clear (OP), etc. A moisturizing liquid cartridge that holds a moisturizing liquid may also be installed. Naturally, the types of ink (how many colors) can be set as needed, and a configuration may be employed in which monochrome printing is performed with black ink alone, or a configuration in which there are two colors of ink, or there are three or more (a number other than eight) colors, and any number of colors may be used.

The ink cartridges IC1 to IC8 are electrically connected to the control device C via a cartridge holder (not shown) in which these ink cartridges are mounted, and information about the remaining amounts of ink of corresponding colors is written to the memory of IC elements 47 (integrated circuit elements; see FIG. 4) mounted on the ink cartridges IC1 to IC8.

Figure 5:
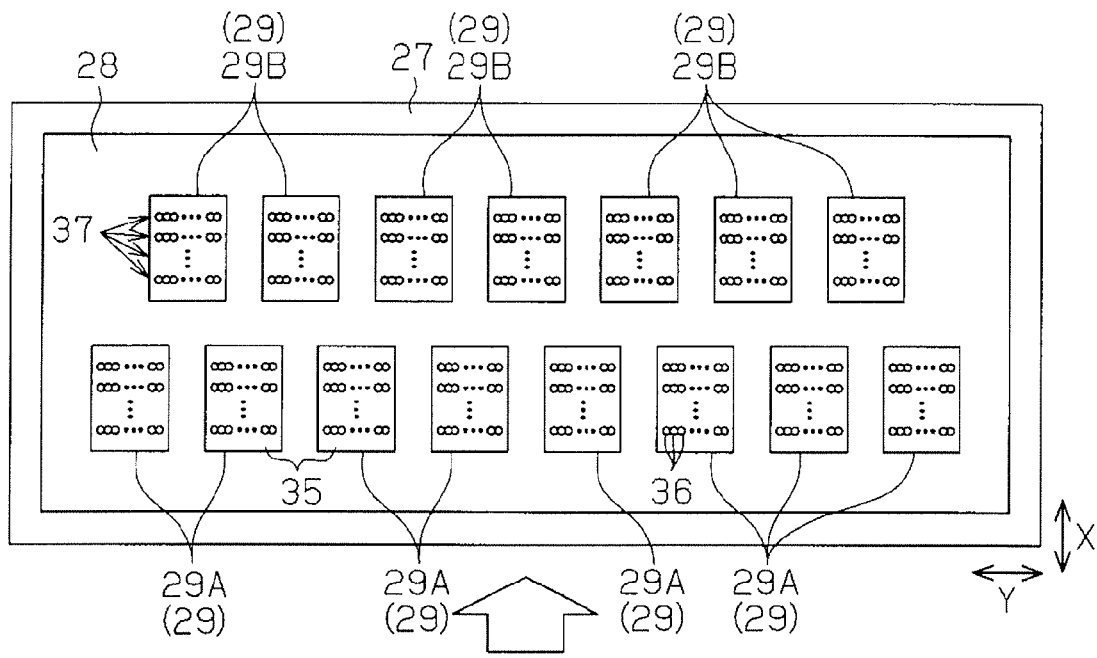
FIG. 5 is a schematic bottom view of a recording head.

FIG. 5 is a schematic view of the bottom face of a cartridge. As shown in FIG. 5, a plurality of (15 in this embodiment) the recording heads 29 are supported on the support plate 28, which is supported on the lower face side of the carriage 27, in a zigzag layout pattern along the width direction (longitudinal direction) perpendicular to the conveyance direction of the sheet 13 (the direction indicated by the outlined white arrow in FIG. 5). A plurality of (eight in this embodiment) nozzle rows 37, in which a plurality of nozzles 36 are disposed in a single row in the longitudinal direction, are formed in the nozzle formation faces 35, which are the lower faces of the recording heads 29, in a specific spacing in the main scanning direction X.

When printing is performed, the carriage 27 moves back and forth in the main scanning direction X a specific number of times according to the printing resolution, thereby performing one print jog. In this example, there is four-pass printing (two times back and forth) and eight-pass printing (four times back and forth), according to the print resolution. In the case of four-pass printing, the carriage 27 moves by half the pitch of the nozzle row spacing in the sub scanning direction Y at the end of every pass in which the carriage 27 moves once in the main scanning direction X, and a single print job comprises a total of four passes. Similarly, in the case of eight-pass printing, the carriage 27 moves by one-quarter the pitch of the nozzle row spacing in the sub scanning direction Y at the end of every pass, and a single print job comprises a total of eight passes. Consequently, in eight-pass printing the print resolution is twice as high as that in four-pass printing.

Figure 2:
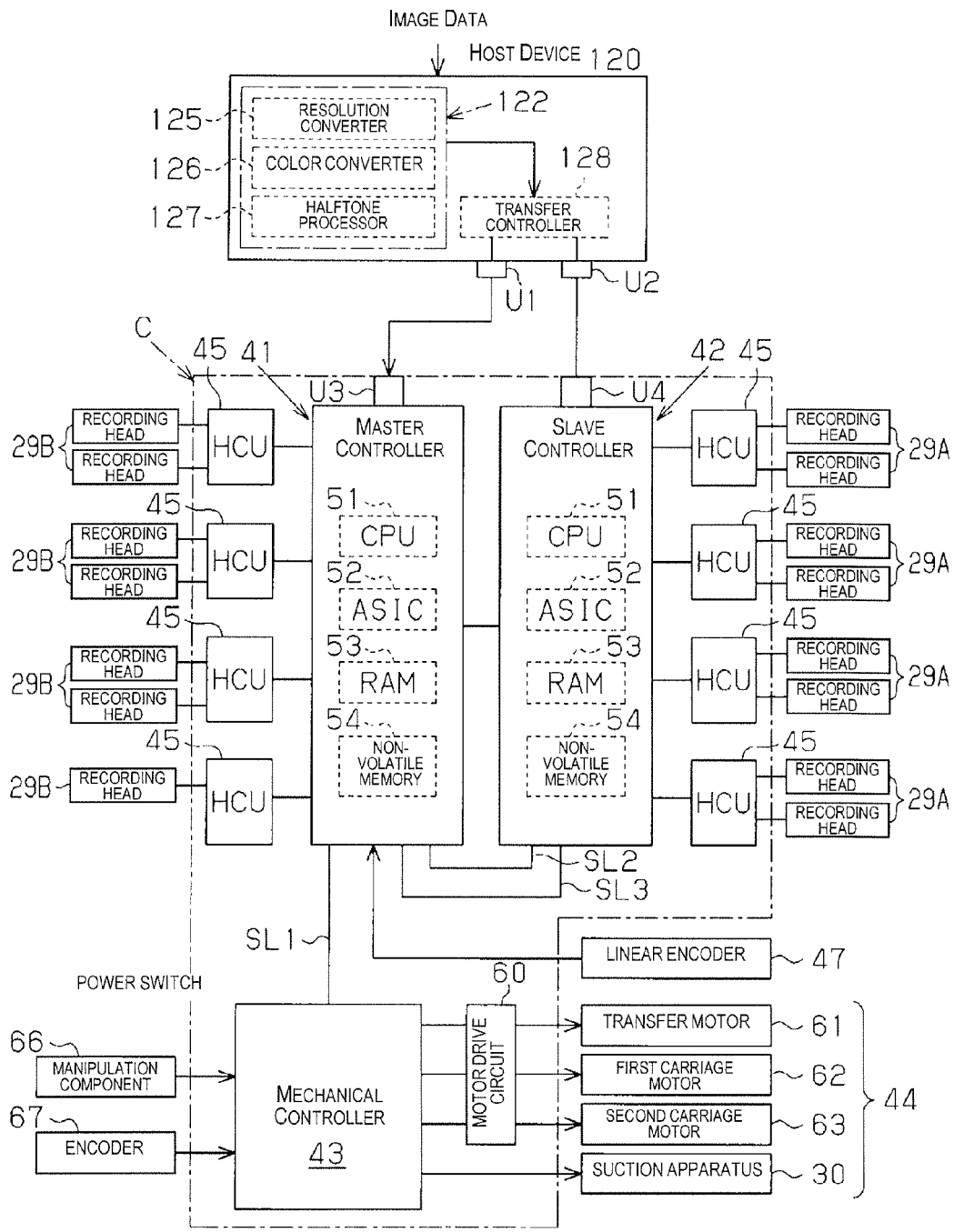
FIG. 2 is a block diagram illustrating the electrical configuration of a printing system.

FIG. 2 is a block diagram of the electrical configuration of the printing system 100. The printer driver 122 in the host device 120 shown in FIG. 4 comprises a resolution converter 125, a color converter 126, and a halftone processor 127, which subject image data ID received from the image generation device 110 to the image processing that is necessary for the production of print data. The resolution converter 125 performs resolution conversion processing to convert the image data ID from display resolution to print resolution. The color converter 126 performs color conversion processing to convert from a display-use color specification system (such as an RGB color specification system) to a printing-use color specification system (such as a CMYK color specification system). The halftone processor 127 performs halftone processing, etc., to convert display-use image data with high tone (such as 256-tone) into printing-use image data with low tone (such as two-tone or four-tone). The printer driver 122 then produces print job data (hereinafter referred to simply as "print data PD") by assigning a command described by a print control code (such as EPC/P) to print image data PI produced as a result of performing the above image processing.

The host device 120 comprises a transfer controller 128 that controls the transfer of data. The transfer controller 128 sequentially and serially transfers the print data PD produced by the printer driver 122 to the printer 11 in data packets of a specific volume.

Meanwhile, the control device C on the printer 11 side comprises a pair of controllers 41 and 42 for performing various kinds of control, including control over the recording system by receiving the print data PD from the host device 120. These controllers 41 and 42 are provided as a pair in order to divide up the plurality of recording heads 29 (15 in this example) into two specific group sizes (seven and eight recording heads in this example) so that their control is allocated. Specifically, there are provided a master controller 41 that handles the control of the seven recording heads 29B, and a slave controller 42 that handles the control of the eight recording heads 29A.

The control device C further comprises a mechanical controller 43 as an example of a drive control units, which is connected through a communication line SL1 to the output side (the control downstream side) of the master controller 41. The mechanical controller 43 is mainly in charge of the control of a mechanical component 44 that includes the conveyance system and the carriage drive system. The master controller 41 sends the mechanical controller 43 a carriage start-up command at the stage when print preparations are ready for the seven recording heads 29B it handles itself (that is, when print image data is ready for use in ink droplet ejection control), and print preparations are ready for the eight recording heads 29A handled by the slave controller 42. This prevents ejection malfunctioning, in which the ink droplets are not ejected even though the recording heads 29 have reached their ejection position, which is attributable to start-up of the carriage 27 before print preparations are complete for either of the controllers 41 and 42.

Also, the master controller 41 sends the mechanical controller 43 a conveyance command, directing the conveyance of the sheet 13, at the stage when printing is complete with the seven recording heads 29B it handles itself, and printing is also complete with the eight recording heads 29A handled by the slave controller 42. This prevents offset in the droplet landing position (printing position offset) with respect to the sheet 13 of the ink droplets ejected from the recording heads 29, which is attributable to the conveyance of the sheet 13 being started (or the release of sheet suction on the platen 19) prior to the completion of printing by one of the controllers 41 and 42. Thus, the master controller 41 needs to have the function of sending commands in synchronization with the advance of the slave controller 42, so the controllers 41 and 42 each function differently in that one has the master function and one the slave function, even though the head control functions with respect to the corresponding recording heads 29 are the same. This embodiment is characterized in that the master controller 41 and the slave controller 42 can be realized with the same program configuration even though their functions are partially different as discussed above. This characteristic feature will be discussed below.

The printer driver 122 in the host device 120 shown in FIG. 2 produces two sets of print data PD by dividing in two the print image data PI while taking into account the positions of the recording heads 29 handled by the two controllers 41 and 42, and assigning the same commands to each set of divided print image data PI.

As shown in FIG. 2, the host device 120 comprises two serial communication ports U1 and U2. The two controllers 41 and 42 also comprise serial communication ports U3 and U4, respectively. The transfer controller 128 serially transfers the print data PDα corresponding to the master controller 41 via communication between the serial communication ports U1 and U3, and serially transfers the print data PDβ corresponding to the slave controller 42 via communication between the serial communication ports U2 and U3. In this embodiment, USB (universal serial bus) ports are used, for example, as the serial communication ports U1 to U4. The host device 120 performs serial transfer with two systems by means of two USB hosts constituting the two serial communication ports U1 and U2, and transfers the print data PDα and PDβ at a relatively high speed to the controllers 41 and 42.

Since serial transfer is relatively slow despite the use of two systems, with the lateral printer 11 of this embodiment, printing is to be started after the print data for a single job (one page) has been completely received. This is because if the printing is started at the stage when the receipt of one pass of print data is complete, for example, there will be a standby time of waiting for the completion of receipt of the next pass of print data in the middle of the procedure, so the carriage 27 must be temporarily retracted to its home position (standby position) within the non-printing region, and the recording heads 29 capped with the caps 33, in order to avoid clogging due to thickening of the ink in the nozzles during this time. If the carriage 27 is thus retracted to its home position in the middle of one printing job, the time the printing takes actually ends up being longer, so printing is to be started after the receipt of all of the print data for a single job (one page).

As shown in FIG. 2, the two controllers 41 and 42 are each connected to a plurality of (N number (four in this example)) head control units 45 (hereinafter referred to simply as HCUs 45), and each of the HCUs 45 is connected to a plurality of (M number (two in this example)) recording heads 29.

As shown in FIG. 2, a linear encoder 47 is connected to the master controller 41. This linear encoder 47 is provided along the movement path of the carriage 27, and a detection signal (encoder pulse signal) having a number of pulses proportional to the movement distance of the carriage 27 is inputted from this linear encoder 47. The encoder pulse signal inputted to the master controller 41 is inputted through a signal line SL2 to the slave controller 42. Further, the master controller 41 and the slave controller 42 are connected to each other through a signal line SL3. The master controller 41 outputs its own command through the communication line SL1 to the mechanical controller 43 at the stage when preparation to output this command are complete and a command has been received from the slave controller 42 through the signal line SL3, as long as the details of the two commands are the same.

As shown in FIG. 2, the controllers 41 and 42 each comprise a CPU 51 (central processing unit), an ASIC 52 (application specific integrated circuit), a RAM 53, and a nonvolatile memory 54. The CPU 51 executes programs stored in the nonvolatile memory 54, and thereby executes various tasks necessary for printing control. The ASIC 52 performs print data processing and other such data processing of the recording system.

Meanwhile, the conveyance motor 61 constituting the mechanical component 44, and a first carriage motor 62 and a second carriage motor 63 constituting examples of movement unit are each connected via the motor drive circuit 60 to the mechanical controller 43. The suction apparatus 30 is connected to the mechanical controller 43.

Also, a manipulation component 66, an encoder 67, and so forth are each connected as the input system to the mechanical controller 43. The mechanical controller 43 controls the drive of the motors 61 to 63 and the suction apparatus 30 according to the various commands received from the master controller 41 through the communication line SL1.

During printing, the control device C performs a conveyance operation in which the conveyance motor 61 is driven and the sheet 13 to be disposed on the platen 19 is conveyed through the next printing region (next page), a suction operation in which the next printing region after sheet conveyance is held against the platen 19 by suction, a printing operation in which the sheet 13 is printed with the recording heads 29, and a suction release operation in which the suction on the sheet 13 is released after completion of the printing of one job (one page). Here, the printing operation is carried out by ejecting droplets of ink from the recording heads 29 during movement of the carriage 27 in the main scanning direction X. This printing operation is carried out by repeating the movement of the carriage 27 in the main scanning direction (one pass operation) by drive of the first carriage motor 62, and movement of the carriage 27 in a sub scanning direction Y that is performed at the end of every pass, for N number of passes (four or eight passes). For example, when a single image is composed of a plurality of impressions, a single image (one page) is printed basically by first printing an image equivalent to one impression by N passes of printing operation, and then repeating this for the number of impressions required. However, an image produced by clear printing (the top impression), in which clear ink is applied by solid printing over the image of the bottom impression to bring out a gloss, there is no need for high-resolution printing, so this printing can be accomplished with large dots in only M passes (which is less than N passes; =N/2K, where K is a natural number).

Figure 3:
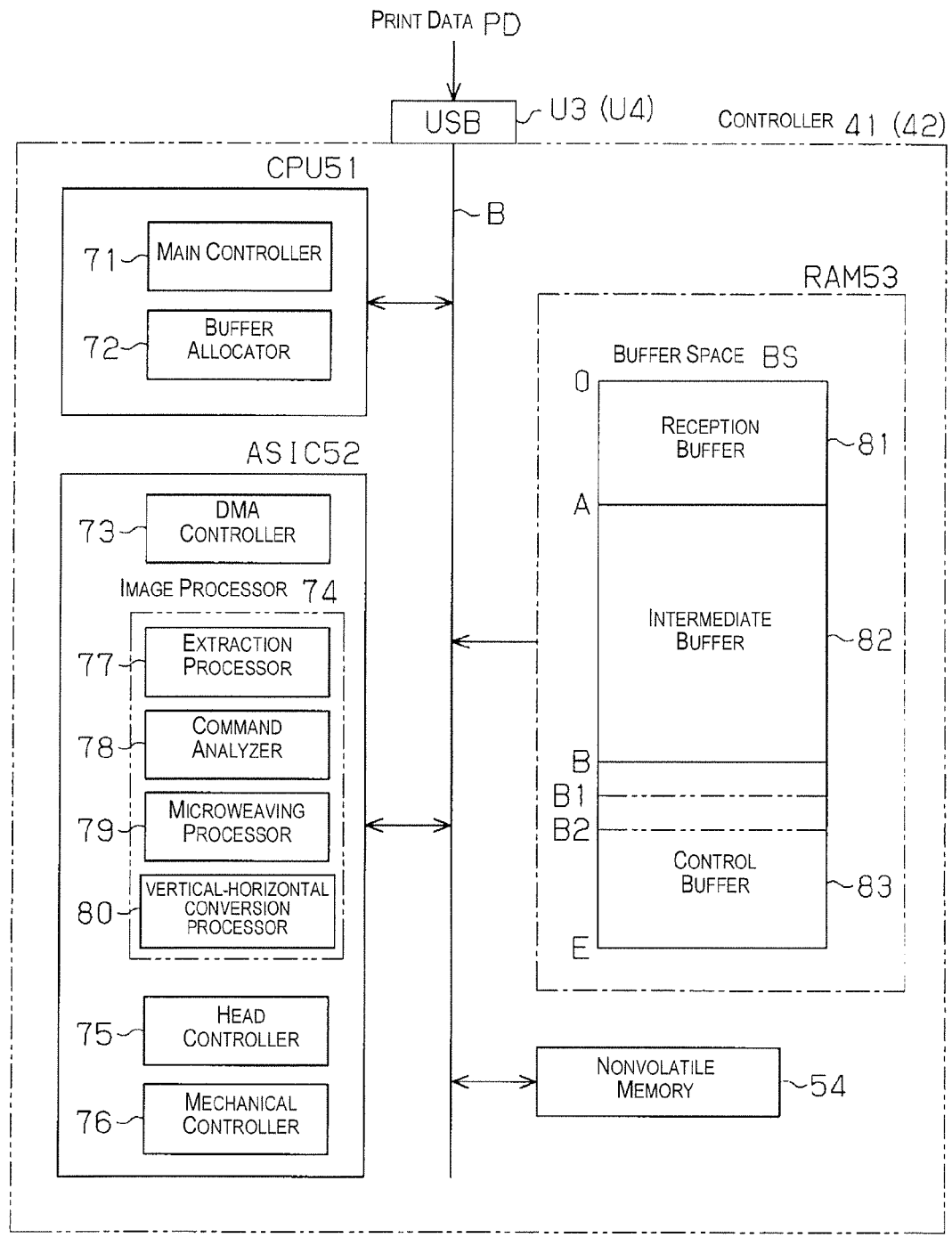
FIG. 3 is a block diagram illustrating the functional configuration of a controller.

FIG. 3 is a block diagram illustrating the function configurations of the master controller 41 and the slave controller 42. The two controllers 41 and 42 have the same functions in terms of image data processing, so only the configuration of the master controller 41 is shown in FIG. 3. As shown in FIG. 3, the master controller 41 comprises the serial communication port U2 (USB port) as an example of an input unit, and the CPU 51, the ASIC 52, the RAM 53, and the nonvolatile memory 54 are connected so as to be able to communicate with each other via a bus B connected to the serial communication port U2.

The CPU 51 comprises a main controller 71 and a buffer allocator 72 (as an example of an allocation unit), as functional portions constructed internally by the execution of programs stored in the nonvolatile memory 54. The ASIC 52 comprises a DMA controller 73, an image processor 74, a head controller 75, and a mechanical controller 76, which are constituted by various electronic circuits, etc., provided on the inside of the ASIC 52. The image processor 74 comprises an extraction processor 77, a command analyzer 78, a microweaving processor 79, a vertical-horizontal conversion processor 80, and so forth. The components 71 to 80 are constituted by software and hardware, for example, but may instead be constituted by software alone or by hardware alone, or one or more of the processors may involve cooperation between software and hardware. In this embodiment, the extraction processor 77 and the command analyzer 78 constitute an example of a first processing unit. Naturally, either the extraction processor 77 or the command analyzer 78 can also constitute an example of the first processing unit. Furthermore, in this embodiment the vertical-horizontal conversion processor 80 constitutes an example of a second processing unit.

A storage region for temporarily storing data and the like in the execution of programs by the CPU 51 is provided to the RAM 53. A specific buffer space BS within the RAM 53 is provided with buffer regions for holding print data PD (first image data) received from the host device 120, plain data MD (intermediate data) produced by subjecting the print data PD to first processing, and head control data HD (second image data) produced by subjecting the plain data MD to second processing. These buffer regions ensure that the inside of the buffer space BS will include a reception buffer 81 (reception buffer region) for holding the print data PD, an intermediate buffer 82 (intermediate buffer region) for holding the plain data MD, and a control buffer 83 (print buffer region) that is an example of an output buffer that holds the head control data HD.

Figure 4:
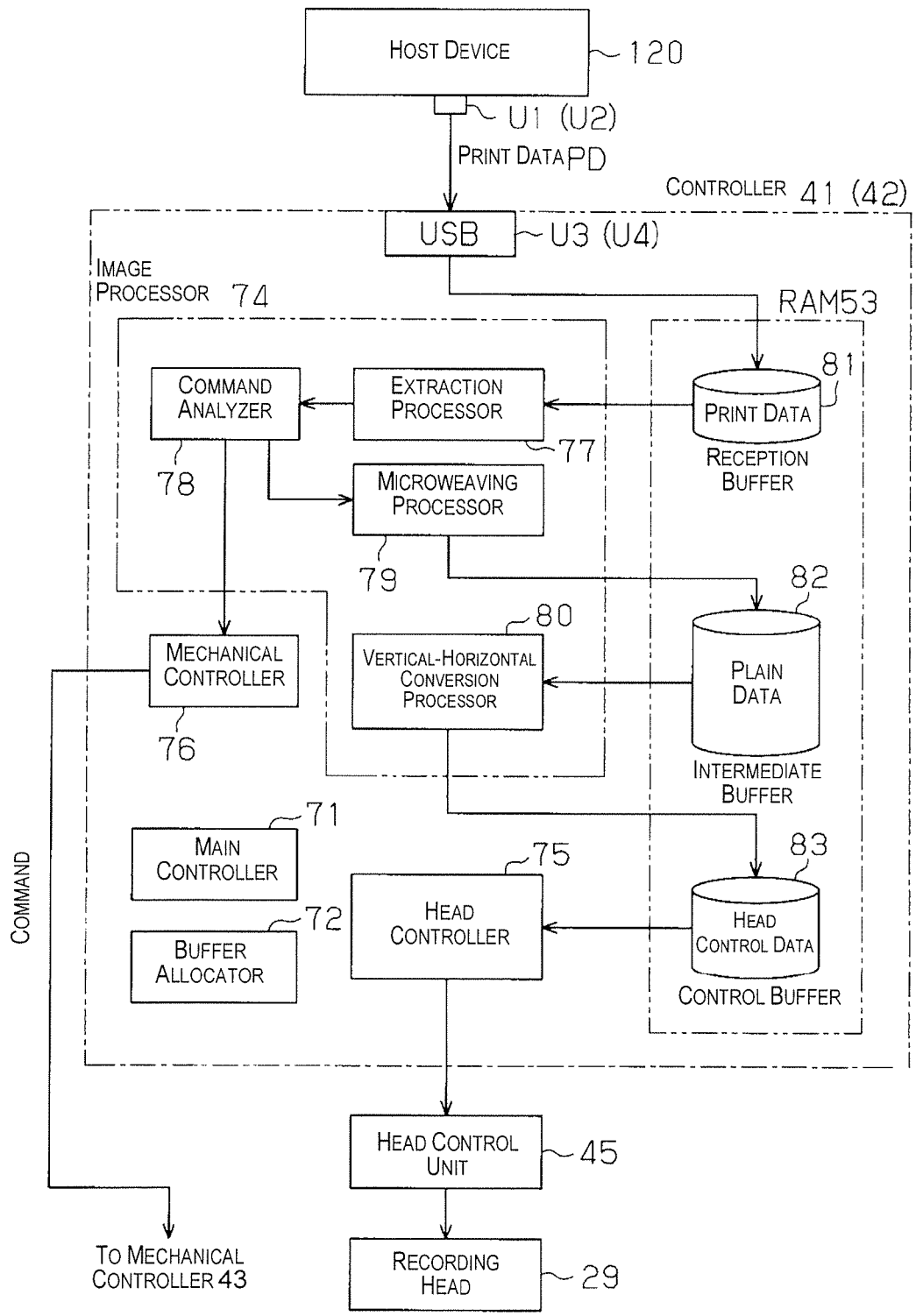
FIG. 4 is a block diagram illustrating the flow of data processing by a controller.

FIG. 4 is a block diagram of the flow of processing of the various components constituting the controller. The functions of the components 71 to 80 will now be described through reference to FIGS. 3 and 4.

The main controller 71 provides comprehensive control over the components 72 to 80. The buffer allocator 72 has the function of dynamically allocating the various buffer regions that are to be used as the reception buffer 81, the intermediate buffer 82, and the control buffer 83 provided to the buffer space BS in the RAM 53. As shown in FIG. 3, in this embodiment, if we let the leading address of the buffer space BS be an address of "0," the buffer allocator 72 initially allocates the reception buffer 81 to the region of addresses 0 to A, initially allocates the intermediate buffer 82 to the region of address A to B, and initially allocates the control buffer 83 to the region of address B to E. The storage capacity of the buffers 81 to 83 in this initial allocation is as follows.

The reception buffer 81 is allocated a storage capacity that allows it to hold print data PD equivalent to 0.5 impression. The intermediate buffer 82 is allocated a storage capacity that allows it to hold plain data MD equivalent to two impressions+one pass. The control buffer 83 is allocated a storage capacity that allows it to hold data equivalent to one impression and M passes. Here, "M" is a number of passes that is less than the "N" of data of N passes, equivalent to one impression (M<N). A certain margin is provided to the storage capacity of the buffers 81 to 83.

The buffer allocator 72 in this embodiment dynamically varies the buffer region (storage capacity) allocated to the intermediate buffer 82 and the control buffer 83 in the course of switching the image to be printed (print job), or when an empty region is generated from the result of monitoring the empty capacity of a buffer. For example, if there is an empty region in the control buffer 83, the buffer allocator 72 reduces the control buffer 83 to the region of address B1 to E, or reduces the control buffer 83 to the region of addresses B2 to E, as shown in the examples in FIG. 3. Consequently, the buffer region allocated to the intermediate buffer 82 is increased by an amount corresponding to this reduction. The buffer allocator 72 thus dynamically varies the storage capacity of the intermediate buffer 82 and the control buffer 83.

The serial communication port U2 (USB port) shown in FIGS. 3 and 4 receives the print data PD from the printer driver 122 of the host device 120 (see FIGS. 1 and 2).

The DMA controller 73 performs data transfer between the RAM 53 and the image processor 74, and between the RAM 53 and the head controller 75, as directed by the CPU 51. The DMA controller 73, for example, performs transfer of the print data PD from the reception buffer 81 to the image processor 74, and transfer of the plain data MD (print image data) from the image processor 74 to the intermediate buffer 82. Further, the DMA controller 73 performs transfer of the plain data MD from the intermediate buffer 82 to the vertical-horizontal conversion processor 80, transfer of the head control data HD from the vertical-horizontal conversion processor 80 to the control buffer 83, and transfer of the head control data HD from the control buffer 83 to the head controller 75. The image processor 74 performs exaction processing of the print data PD, command analysis processing, microweave processing, vertical-horizontal conversion processing, and other such image processing.

The extraction processor 77 performs extraction processing of the print data PD (compressed data) held in the reception buffer 81, and sends the extracted print data to the command analyzer 78. The print data PD here includes the plain data MD (print image data) and commands.

The command analyzer 78 divides the extracted print data PD into plain data MD (print image data) and commands, analyzes a command and sends it to the mechanical controller 76, and stores the plain data MD in the intermediate buffer 82.

The microweaving processor 79 performs microweave processing on the plain data MD separated from the command. The microweave processing referred to here is processing in which pixel data is rearranged to change the nozzles that are used, so that the nozzles forming adjacent printing dots in the sub scanning direction Y will not be adjacent nozzles, in order to prevent variance from occurring in the printed dot positions, which is attributable to variance in the nozzle positions of the recording heads 29. The microweaving processor 79 successively stores the plain data MD that has undergone microweave processing in the intermediate buffer 82.

The vertical-horizontal conversion processor 80 performs vertical-horizontal conversion processing on the plain data MD that has undergone microweave processing and has been transferred from the intermediate buffer 82. Here, the plain data MD obtained when the image processor 74 extracts the print data PD is data arranged in the order of display pixels, so in vertical-horizontal conversion processing, the arrangement order of pixels in the lateral display direction (the direction in which the nozzle rows are arranged) is converted to arrangement in the longitudinal order (nozzle row direction), to match the ejection order in which the ink droplets are ejected from the nozzles 36 of the recording heads 29. The vertical-horizontal conversion processor 80 successively stores the head control data HD produced by vertical-horizontal conversion processing in the control buffer 83.

The head controller 75 divides up the head control data HD transferred from the control buffer 83 into data for each of the recording heads 29, and sequentially transfers the data to the various head control units 45 (HCUs). The head control data HD is sequentially sent from the HCUs 45 to the recording heads 29. The head drive circuits (not shown) in the recording heads 29 control the drive of ejection drive elements for each of the nozzles 36 based on the head control data HD, and eject the ink droplets from the nozzles 36. At this point, the head controller 75 produces an ejection timing signal based on an encoder pulse signal inputted from the image processor 74, and the head drive circuits drive the ejection drive elements at a specific timing based on this ejection timing signal.

The mechanical controller 76 shown in FIGS. 3 and 4 sends the command received from the command analyzer 78 to the mechanical controller 43. At this point the mechanical controller 76 monitors the progress of the processing of the head controller 75, for example, and sends the command to the mechanical controller 43 at the stage when the head control data HD to be used for the next pass of printing is ready, and printing preparations complete. Commands include, for example, a conveyance command, a suction command, a first carriage start-up command (carriage main scanning direction movement command), a second carriage start-up command (carriage sub scanning direction movement command), and a suction release command. These commands are sent to the mechanical controller 43 at a suitable timing that matches the progress on the mechanical controller 43 side.

The mechanical controller 43 shown in FIG. 2 controls the drive of the mechanical component 44 according to the command. In the case of a conveyance command, for example, the mechanical controller 43 drives the conveyance motor 61 to convey the sheet 13, and in the case of a first carriage start-up command, it drives the first carriage motor 62 and moves the carriage 27 in the main scanning direction X. While the carriage 27 is moving, the recording heads 29 controlled by the controllers 41 and 42 eject out ink droplets from their nozzles, and one pass of printing is performed on the print region of the sheet 13. The drive of the second carriage motor 63 then moves the carriage 27 in the sub scanning direction Y under the command received for each pass, while the carriage 27 is moved in the main scanning direction, the result being that printing is performed the specified number of passes. Drive from the second CR motor 63 then moves the carriage 27 in the sub scanning direction Y according to the command received for one pass, while the carriage 27 is moved in the main scanning direction X, which performs printing of N passes. This printing of N passes results in the printing of an image of one impression, for example. Images of a plurality of impressions are then printed in layers to print a single image (one page) composed of a plurality of impressions. When the printing of one page of images is finished, the conveyance motor 61 is driven and the sheet 13 conveyed to the next print position under the conveyance command that is received next.

Figure 6:
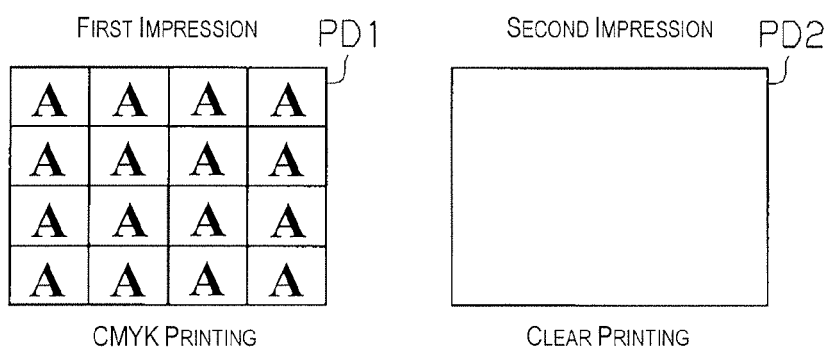
FIG. 6 is a schematic view illustrating the procedure in two-impression printing.

FIG. 6 shows images for several impressions that constitute the page of images to be printed. In the example in FIG. 6, the image is for label printing in which numerous labels printed with the character "A" are printed at the same time. One page of images is made up of two impressions. Specifically, as shown in FIG. 6, it is composed of image data of the first impression (hereinafter referred to as first impression print data PD1) and image data of the second impression (hereinafter referred to as second impression print data PD2). The first impression print data PD1 is image data for printing a colored image with CMYK ink (CMYK printing). The second impression print data PD2 is image data for clear solid printing with clear ink. The second impression print data PD2 used for clear printing is only a fraction the data size (less than one-fourth in this example) as compared to the first impression print data PD1 used to print text and graphics with CMYK ink, so it only requires solid printing at a low resolution (larger dots).

Figure 7:
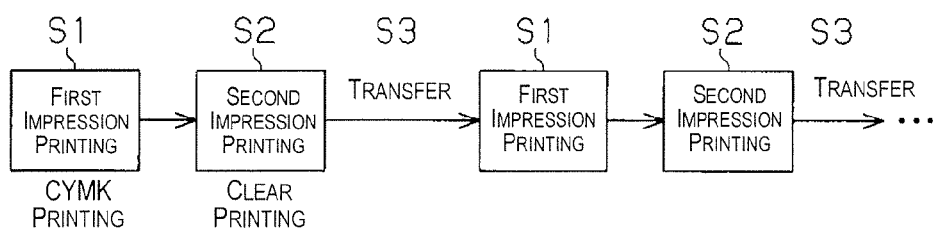
FIG. 7 is a schematic view illustrating the procedure in two-impression printing.

FIG. 7 is a schematic view illustrating the procedure in two-impression printing. When the two-impression image shown in FIG. 6 is printed, the first impression printing is performed with CMYK ink (CMYK printing) on the sheet 13 to print text or graphics (S1), and then the second impression printing (clear printing) is performed with clear ink over the first impression printing (S2). When the printing of one page of images is completed by the first and second impression printing, the sheet 13 is conveyed to the printing position for the next page (S3). Then, in the same manner, first impression printing (S1) and second impression printing (S2) are successively carried out, and after one page of printing is finished, the sheet 13 is conveyed to the printing position for the next page (S3). The CMYK printing of the first impression is performed in four or eight passes of printing, and the clear printing of the second impression is performed in one or two passes of printing, which is one-fourth the number in CMYK printing, for example.

FIGS. 8A and 8B shows the data holding state of a print buffer, with FIG. 8A showing the case of four passes per impression, and FIG. 8B showing the case of eight passes per impression. The control buffer 83 has a storage capacity in which a small, specific margin has been added to the storage capacity that allows the storage of head control data equivalent to five passes of printing at four passes per impression (hereinafter also referred to simply as "data"). Therefore, during the printing at four passes per impression shown in FIG. 8A, head control data D1-1, D1-2, D1-3, and D1-4 for the four passes of the first impression, and head control data D2 for the second impression can be held in the control buffer 83. During the printing of eight passes per impression shown in FIG. 8A, the head control data D1-1, D1-2, D1-3, D1-4, D1-5, D1-6, D1-7, and D1-8 for the eight passes of the first impression, and head control data D2-1 and D2-2 for the second impression can be held in the control buffer 83. In FIGS. 8A and 8B, the first numeral in the symbol "D1-1" indicating data refers to the impression number, while the last numeral refers to the number of the pass. Thus, data "D1-1" refers to data of the first pass of the first impression. However, data for which one impression is composed of only one pass is labeled with just one numeral indicating the number of the impression, such as "D2."

In this embodiment, the buffer allocator 72 is set so that the control buffer 83 will be initially allocated a storage capacity that allows it to hold head control data for (N+M) passes (where $1 \leq M < N$). That is, the control buffer 83 is set to a storage capacity that allows it to hold data for one impression (N passes) of CMYK printing and data for one impression (M passes) of clear printing. Also, in this embodiment, the data for one impression of CMYK printing is equivalent to that for four passes, and the data for one impression of clear printing is equivalent to one-fourth the data for one impression of CMYK printing. Accordingly, the control buffer 83 is allocated storage capacity that allows it to hold head control data for (N+1) passes, that is, five passes.

As shown in FIGS. 8A and 8B, the data for the two-impression image shown in FIG. 6 can all be held in the control buffer 83 in the case of both four passes per impression and eight passes per impression. That is, as shown in FIG. 8A, in the case of four passes per impression, the data D1-1, D1-2, D1-3, and D1-4 for the first to fourth passes of the first impression, which is equivalent to the first impression print data PD1, and data D2 for the one pass of the second impression, which is equivalent to the second impression print data PD2, are held. In the case of eight passes per impression as shown in FIG. 8B, the data D1-1, D1-2, D1-3, D1-4, D1-5, D1-6, D1-7, and D1-8 for the first to eighth passes of the first impression, which is equivalent to the first impression print data PD1, and the data D2-1 and D2-2 for the one pass of the second impression, which is equivalent to the second impression print data PD2, are held.

Thus, when printing a plurality of two-impression images including a first impression image for CMYK printing and a second impression image for clear printing as shown in FIG. 6, data processing is performed when printing the first page of images, and data is produced in the control buffer 83 as shown in FIGS. 8A and 8B. Accordingly, the printing of the second and subsequent pages of images can be performed by repeatedly transferring the data held in the control buffer 83 to the recording heads 29. In this case, since the entire region of the upstream buffers 81 and 82 can be used for the processing of subsequent print data, the data processing of subsequent print data can be carried out in parallel with the print processing.

FIG. 9 shows an example in which the images of one page to be printed consist of three impressions of image data. As shown in FIG. 9, this consists of first impression print data (hereinafter referred to as "first impression print data PD11"), second impression print data (hereinafter referred to as "second impression print data PD12"), and third impression print data (hereinafter referred to as "third impression print data PD13"). The first impression print data PD11 and the second impression print data PD12 are mutually different image data for printing colored images with CMYK ink (CMYK printing). The third impression print data PD13 is image data for clear solid printing with clear ink. The third impression print data PD13 used for clear printing is only a fraction the data size (less than one-fourth in this example) as compared to the first impression print data PD11 and the second impression print data PD12 used for CMYK printing.

FIG. 10 is a schematic view illustrating the procedure in three-impression printing. When the three-impression image shown in FIG. 9 is printed, the first impression printing (CMYK printing) is performed with CMYK ink on the sheet 13, to print text or graphics (S11), and then the second impression printing (CMYK printing) is performed with CMYK ink over the first impression printing (S12). Then the third impression printing (clear printing) is performed with clear ink over the second impression printing (S13).

When the printing of one page of images is completed by the first to third impression printing, the sheet 13 is conveyed to the printing position for the next page (S14). Then, in the same manner, first impression printing (S11), second impression printing (S12), and third impression printing are successively carried out, and every time one page of printing is finished, the sheet 13 is conveyed to the printing position for the next page (S14). The CMYK printing of the first and second impressions is performed in four or eight passes of printing, and the clear printing of the third impression is performed in one or two passes of printing, which is one-fourth the number in CMYK printing, for example.

In the case of this three impression printing, the data for an entire page cannot be held in the control buffer 83, which can only hold data equivalent to five passes at four passes per impression. Accordingly, with three impression printing, in printing of the second and subsequent pages (jobs), the data from the control buffer 83 cannot be used repeatedly as in the example of two impression printing shown in FIGS. 6 and 8.

Therefore, in the printing of the second and subsequent pages in three impression printing, the plain data MD for the third impression held in the intermediate buffer 82 is subjected to vertical-horizontal conversion processing in the order of first to third impressions by the vertical-horizontal conversion processor 80, and is held in the control buffer 83 while the three-impression image is printed.

Here, if the intermediate buffer 82 is full of the plain data MD during the current print processing, then the print data PD of the next image can only be received up to the storage capacity of the reception buffer 81 (such as one-half impression). The data received by the serial communication ports U3 and U4 is transferred at a relatively low rate, and data transfer (data reception) that goes through this serial communication becomes the rate limiting factor in determining the printing start time for the next image. Accordingly, it is preferable if the receipt of print data for the next image is started as soon as possible during the print processing of the current image, so that the entire page of print data PD for the next print data PD will already have been received at the point when the last page of the current image is finished printing, and data equivalent to the first few passes of the first impression of the next image is held in the control buffer 83. In this embodiment, the buffer allocator 72 dynamically allocates the regions of the intermediate buffer 82 and the control buffer 83 in the process of printing the final page of the current image, and dynamically switches the various storage capacities, which allows the above-mentioned conditions to be satisfied as far as possible.

Figure 11:
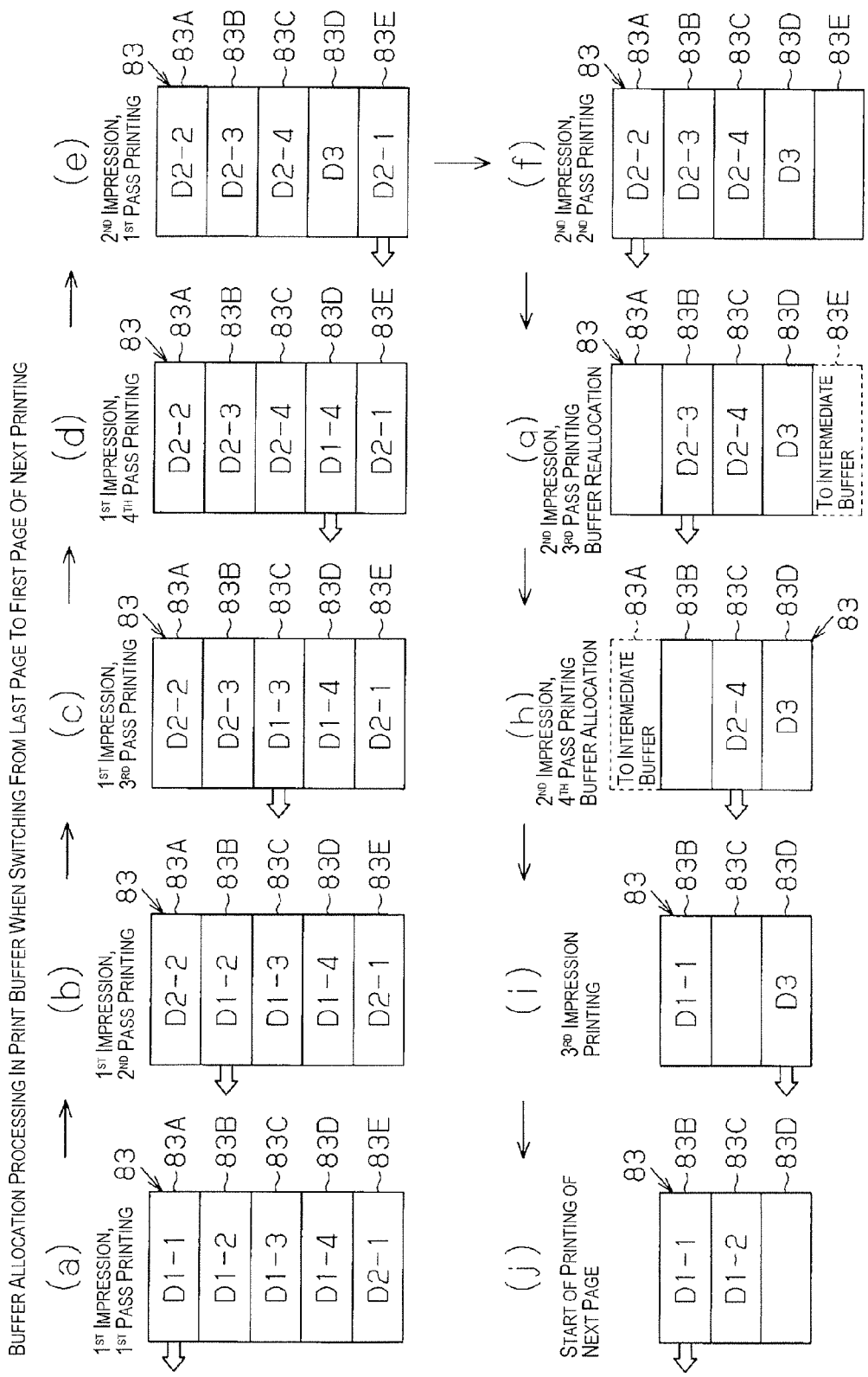
FIG. 11 includes diagrams (a) to (j) that are schematic views illustrating buffer allocation processing in a print buffer.

The diagrams (a) to (j) in FIG. 11 show a print buffer when the storage capacity of the buffer is dynamically changed. The example in the diagrams (a) to (j) in FIG. 11 involves buffer allocation processing by the control buffer 83 when switching from the last page of the image during current print processing to the first page of the next image. The diagrams (a) to (j) in FIG. 11 show an example of printing an image composed of three impressions as shown in FIG. 9.

As shown in FIG. 11(a), at the start of printing of the first impression in the first to last pages, the control buffer 83 holds the data D1-1, D1-2, D1-3, and D1-4 for four passes equivalent to the first impression print data PD1, and the data D2-1 for one pass equivalent to the second impression print data PD2. When the printing of the final page is started, first the data D1-1 indicated by the outlined white arrow is transferred to the recording heads 29 and printing of the first impression and the first pass is performed.

Next, as shown in FIG. 11(b), the data D2-2 for the second impression and the second pass is stored in the empty storage region 83A left when the data D1-1 of the first impression and the first pass was transferred out. At about the same time, the data D1-2 of the second pass indicated by the outlined white arrow is transferred to the recording heads 29, and printing for the second pass is performed.

Next, as shown in FIG. 11(c), the data D2-3 for the second impression and the third pass is stored in the empty storage region 83B left when the data D1-2 of the first impression and the second pass was transferred out. At about the same time, the data D1-3 indicated by the outlined white arrow is transferred to the recording heads 29, and printing for the first impression and the third pass is performed.

Next, as shown in FIG. 11(d), the data D2-4 for the second impression and the fourth pass is stored in the empty storage region 83C left when the data D1-3 of the first impression and the third pass was transferred out. At about the same time, the data D1-4 indicated by the outlined white arrow is transferred to the recording heads 29, and printing for the first impression and the fourth pass is performed. This ends the printing of the first impression image.

Next, as shown in FIG. 11(e), the data D3 for the third impression is stored in the empty storage region 83D left when the data D1-4 of the first impression and the fourth pass was transferred out. At about the same time, the data D2-1 indicated by the outlined white arrow is transferred to the recording heads 29, and printing for the second impression and the first pass is performed.

Next, as shown in FIG. 11(f), in a state in which the storage region 83E has become empty after the data D2-1 of the second impression and the first pass was transferred out, the data D2-2 indicated by the outlined white arrow is transferred to the recording heads 29, and printing for the second impression and the second pass is performed.

Then, as shown in FIG. 11(g), the empty storage region 83E left when the data D2-1 of the second impression and the first pass was transferred out is allocated to the intermediate buffer 82. At about the same time, the data D2-3 indicated by the outlined white arrow is transferred to the recording heads 29, and printing for the second impression and the third pass is performed.

Further, as shown in FIG. 11(h), the empty storage region 83A left when the data D2-2 of the second impression and the second pass was transferred out is allocated to the intermediate buffer 82. At about the same time, the data D2-4 indicated by the outlined white arrow is transferred to the recording heads 29, and printing for the second impression and the fourth pass is performed.

Next, as shown in FIG. 11(i), the data D1-1 for the first impression and the first pass of the next image is stored in the empty storage region 83B left when the data D2-3 of the second impression and the third pass was transferred out. At about the same time, the data D3 indicated by the outlined white arrow is transferred to the recording heads 29, and printing for the third impression is performed.

Then, as shown in FIG. 11(j), the data D1-2 for the first impression and the second pass of the next image is stored in the empty storage region 83C left when the data D2-4 of the second impression and the fourth pass was transferred out. At about the same time, the data D1-1 indicated by the outlined white arrow is transferred to the recording heads 29, and printing for the first impression and the first pass of the next image is performed. After this, the buffer allocator 72 successively allocates regions large enough to hold two passes of data from the intermediate buffer 82 to the control buffer 83. As a result, in the midst of printing of the first impression of the next image, the data D1-1, D1-2, D1-3, D1-4, and D2-1 for five passes will be held for the next image as well, as shown in FIG. 11(a).

Thus, during the printing of the last page of the current image, the empty region of the control buffer 83 is reallocated to the intermediate buffer 82, which temporarily increases the storage capacity of the intermediate buffer 82, and this allows reception of the print data PD for the next image to proceed with as little down time as possible.

For example, if the storage capacity of the intermediate buffer 82 is not dynamically increased, at the point when the intermediate buffer 82 fills up with data, extraction processing, microweave processing, and the like by the image processor 74 will not proceed, and when the reception buffer 81 soon after fills up with the print data PD, the reception of print data PD will come to a halt. With this embodiment, however, since the storage capacity of the intermediate buffer 82 is increased, image processing such as extraction and microweaving can continue correspondingly longer, so reception of the print data PD by the reception buffer 81 can also continue correspondingly longer. As a result, when the printing of the last page of the current image is finished, the printing of the first impression of the first page of the next image can start right away.

As detailed above, the following effects can be obtained with this embodiment.

(1) Since the control buffer 83 can hold head control data equivalent to (N+1) passes, the printing of the first pass of the next impression can be started right away after the printing of the first impression by the recording heads 29 is finished.

(2) The control buffer 83 is ensured of having a storage capacity that allows it to hold head control data equivalent to (N+M) passes (where $1 \leq M < N$), and the storage capacity equivalent to M passes is set to a value corresponding to one impression of image data for clear printing. Thus, when a plurality of two-impression images are printed in which the first impression is made by CMYK printing and the second impression by clear printing, copy printing can be performed in which the head control data held in the control buffer 83 is used repeatedly. Therefore, there is no need for data processing for the second and subsequent print jobs when a plurality of jobs are printed. As a result, processing by the image processor 74 of the image currently being printed is freed up, and the intermediate buffer 82 is also freed up, so the plurality of jobs can proceed in parallel with the processing of the next print data, and the entire region of the intermediate buffer 82 can be used.

(3) If the head control data for printing an image composed of a plurality of impressions cannot completely fit in the control buffer 83 because it is over the capacity of (N+1) passes, then in the printing of the second and subsequent jobs when a plurality of jobs are printed, processing including vertical-horizontal conversion processing of the print image data held in the intermediate buffer 82 will just end up being unused. Specifically, reception processing, extraction processing, and so forth of the print data from the host device 120 need only be performed once for the first job. Thus, all that is need is vertical-horizontal conversion processing, which is relatively fast processing, so a delay in print processing can be avoided, and a plurality of jobs can be printed at relatively high speed.

(4) Since the image data for the next pass is successively stored in the empty region of the control buffer 83, this avoids as much as possible a situation in which the intermediate buffer 82 fills up and the reception of the next image data, or the processing thereof, comes to a halt. Accordingly, data processing from the reception buffer 81 to the intermediate buffer 82 can proceed, and to the extent that the reception buffer 81 is freed up, the reception processing of print data from the host device 120 can proceed.

(5) In the course of switching the image to be printed, the buffer allocator 72 sequentially allocates to the intermediate buffer 82 the empty regions created in the control buffer 83, so reception, processing, and so forth of the next image will be less likely to come to a halt due to the intermediate buffer 82 becoming full. Accordingly, data processing by the image processor 74 from the reception buffer 81 to the intermediate buffer 82 can proceed, and to the extent that the reception buffer 81 is freed up, the reception processing of print data from the host device 120 can proceed.

(6) Since the master controller 41 and the slave controller 42 are allocated a share of the control over the plurality of recording heads 29, the processing load on the controllers 41 and 42 can be reduced.

The embodiment described above can also be modified as follows.

The buffer allocator 72 may be constituted so that it does not perform dynamic allocation. With this constitution, high-speed printing can be accomplished merely by including simple processing such as vertical-horizontal conversion processing or copy printing in which the data of the print buffer is used repeatedly in the printing of a plurality of jobs.

The storage capacity of the control buffer 83 is not limited to a data volume equivalent to (N+1) passes (that is, five passes) in printing at four passes per impression. For example, with a printer used in printing at eight passes per impression, the data volume may be equivalent to (N+1) passes (that is, nine passes). Furthermore, the storage capacity of the control buffer 83 may be variable so that it is a value equivalent to (N+1) passes, according to whether the printing is at N passes per impression (such as printing at four passes per impression), or printing at 2N passes per impression (such as printing at eight passes per impression).

The buffer allocator may be constituted so that it monitors the usage rates of the three buffers 81 to 83, and the storage capacity of the buffers 81 to 83 is variable so that there is no halting of data processing or data transfer, according to the usage rates at different times. For instance, when there is no print data being received and the entire reception buffer 81 is empty, part of that empty region may be allocated to the other buffers 82 and 83 downstream. A constitution may also be employed in which, when there is an empty region in the intermediate buffer 82 but there is no empty region in the reception buffer 81, or the empty region is extremely small (below a threshold), part of the empty region in the intermediate buffer 82 is allocated to the reception buffer 81. Further, a constitution may also be employed in which, when there is an empty region in the intermediate buffer 82 and the reception buffer 81 is completely empty and no data is to be received, part of the empty region in the intermediate buffer 82 is allocated beyond the rated (N+M) passes (such as (N+1) passes) to the control buffer 83. With these constitutions, the buffers 81 to 83 can be utilized the most effectively, so that data processing during the printing of a plurality of jobs can be eliminated as much as possible, or the reception of subsequent print data during printing can proceed in parallel, which means that a situation in which the data processing is not completed in time and the system must wait to start printing at the recording heads 29 can be effectively avoided.

The image data used for clear printing, which is second impression image data, is not limited to a data volume of one pass (that is, M=1) of image data for CMYK printing, which is first impression image data, and may instead be a data volume of M passes (where M is a natural number such that 2≤M<N) of image data for CMYK printing, which is first impression image data. The storage capacity of the control buffer 83 may be six passes or seven passes in printing at four passes per impression of second impression image data, for example.

In the above embodiments, storage capacity was allocated to allow the holding of data for a total of two impressions, comprising one impression of CMYK printing and one impression of clear printing, but the control buffer 83 need only be set to a storage capacity that allows data equivalent to two impressions to be held. For example, it may be set to a storage capacity that allows it to hold data for two impressions of CMYK printing.

A constitution can also be employed in which print data is sent by some form of communication other than serial communication from the host device 120.

A constitution can also be employed in which display image data is received from the host device 120, and the image processor 74 within the printer performs resolution conversion processing, color conversion processing, halftone processing, or other such processing that the printer driver 122 performed.

There may be only one controller that controls the recording heads. Or, the control of the plurality of recording heads may be allocated to three or more controllers.

The present invention may also be applied to a printer comprising only one recording head.

There may be only one recording head. For example, a constitution can also be employed in which control over head regions obtained by dividing up all the nozzles in a long recording head used for line recording is allocated to two or more controllers.

The printing device is not limited to being a lateral printer, and may instead be a serial printer, a line printer, or a page printer. Nor is it limited to being an inkjet printer, and may instead be a dot impact printer. In the case of the lateral printer in the above embodiments, printing was started after all of the print data for one page had been completely received, but with a serial printer, printing may be started at the point when head control data equivalent to a specific number of initial passes (such as one pass) has been ensured.

In the above embodiments, the inkjet printer 11 was employed as the printing device, but a liquid ejection device that ejects or discharges some liquid other than ink may be employed instead. It is also possible to use various kinds of liquid ejection device equipped with a liquid ejection head, etc., for discharging droplets in tiny amounts. In this case, the term "droplets" refers to the state of a liquid discharged from the above-mentioned liquid ejection device, and encompasses a granular shape, a teardrop shape, and a feathered thread shape. The "liquid" referred to here may be any material that can be ejected from a liquid ejection device. For example, it may be one in which the substance is in the liquid phase, and encompasses not only liquids such as high or low viscosity liquids, sols, gels, water or other inorganic solvents, organic solvents, solutions, liquid resins, and liquid metals (molten metals), or materials in which a liquid is one of the states of the substance, but also the product of dissolving, dispersing, or mixing grains of a functional material composed of a pigment, metal particles, or other such solid in a solvent. Typical examples of liquids include ink, as described in the above embodiments, and liquid crystals. Here, the term "ink" encompasses standard oil-based inks and water-based inks, as well as various kinds of liquid composition, such as holt melt inks or gel inks. Specific examples of liquid ejection devices include those that eject out a liquid containing, in the form of a dispersion or solution, a material such as an electrode material or colorant, and used in the manufacture of liquid crystal displays, EL (electroluminescent) displays, flat screen displays, and color filters, for example. Other examples include a liquid ejection device that ejects out a biological organic substance used in bio-chip manufacture, a liquid ejection device that ejects out a liquid that serves as a sample and is used as a compacted pellet, a textile printing device, a microdispenser, etc. Furthermore, a liquid ejection device that ejects out a pinpoint stream of lubricating oil onto clocks, cameras, or other such precision machinery, a liquid ejection device that ejects a UV-setting resin or other such transparent resin liquid onto a substrate in order to form a microscopic hemispherical lens (optical lens) used in optical communication elements or the like, or a liquid ejection device that ejects out an acidic, alkaline, or other etching solution to etch a substrate or the like may be employed. The present invention can be applied to any of these types of liquid ejection device. Also, the liquid may be particles, such as a toner. The term "liquid" as used in this Specification does not include anything composed solely of a gas.

The technological concepts that can be grasped from the above embodiments and modification examples are compiled below.

(A) The liquid ejection control device according to any of Claims 1 to 8, wherein the input unit is a serial communication means. With this constitution, the image data is received relatively slowly via the serial communication means, and this reception processing is the rate-limiting factor in determining the starting time of liquid ejection processing for forming an image on the target. However, in forming the images for the second and subsequent jobs, this does not entail reception of image data via the serial communication means, and an image can be formed by repeatedly using the image data held in the internal buffers, so the images for a plurality of jobs can be formed relatively fast.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A liquid ejection control device adapted to form a single image including a plurality of impressions by ejecting liquid and superposing a plurality of images respectively corresponding to the impressions, the liquid ejection control device comprising:
    an input unit configured to input image data;
    an input buffer configured to store first image data inputted by the input unit the first image data including the plurality of impressions;
    a processing unit configured to produce second image data by subjecting the first image data to processing;
    an output buffer configured to store the second image data;
    a liquid ejection unit configured so as to superpose the images respectively corresponding to the plurality of impressions on a target based on the second image data, the output buffer having a storage capacity that is capable of holding image data equivalent to at least two impressions out of the plurality of impressions; and
    an allocation unit configured to dynamically allocate the storage capacity of the output buffer,
    when, in the course of switching the image formed by liquid ejection of the liquid ejection unit, formation of the last image prior to the switch ends and results in a blank pass in the output buffer, the allocation unit allocating the blank pass to a buffer located upstream in a data flow direction with respect to the output buffer.

2. The liquid ejection control device according to claim 1, wherein
    the liquid ejection unit is configured to form an image of one of the impressions by moving relative to the target by N passes, where N is a natural number that satisfies N≥2, and
    the output buffer has the storage capacity that is capable of holding the second image data in an amount equivalent to a set number of passes that is at least (N+1) and less than 2N.

3. A liquid ejection device comprising:
    the liquid ejection control device according to claim 2;
    a movement unit configured to relatively move the liquid ejection unit and the target; and
    a drive control unit configured to control the movement unit.

4. The liquid ejection control device according to claim 1, wherein
    the image data includes first impression image data in which one impression of data is formed by relative movement of the liquid ejection unit by N passes with respect to the target, and second impression image data which is an amount of data equivalent to M passes of the first impression image data, where M is a natural number that satisfies 1≤M<N, and
    the output buffer has a storage capacity that is capable of holding the second image data equivalent to (N+M) passes.

5. The liquid ejection control device according to claim 1, wherein
    the second impression image data has a data volume equivalent to one pass of the first impression image data, and is image data of an impression for clear ejection processing in which a transparent liquid is ejected, and
    the output buffer has a storage capacity that is capable of holding the second image data equivalent to (N+1) passes of the first impression image data.

6. A liquid ejection device comprising:
    the liquid ejection control device according to claim 5;
    a movement unit configured to relatively move the liquid ejection unit and the target; and
    a drive control unit configured to control the movement unit.

7. A liquid ejection device comprising:
    the liquid ejection control device according to claim 4;
    a movement unit configured to relatively move the liquid ejection unit and the target; and
    a drive control unit configured to control the movement unit.

8. The liquid ejection control device according to claim 1, wherein
    the input unit is configured to input image data and commands, and two of the input units are provided,
    the processing unit is configured to process image data and commands inputted by the input unit, and two of the processing units are provided corresponding to the input units,
    two control units are provided, each having the input unit, the processing unit, the input buffer, and the output buffer, and
    the two control units share control of the liquid ejection unit, and output commands to a drive control unit to control drive of a mechanical component, with one of the control units being synchronized with the other.

9. A liquid ejection device comprising:
    the liquid ejection control device according to claim 8;

a movement unit configured to relatively move the liquid ejection unit and the target; and a drive control unit configured to control the movement unit.

10. A liquid ejection device comprising:

the liquid ejection control device according to claim 1;

a movement unit configured to relatively move the liquid ejection unit and the target; and a drive control unit configured to control the movement unit.

11. A liquid ejection control device adapted to form a single image including a plurality of impressions by ejecting liquid and superposing a plurality of images respectively corresponding to the impressions, the liquid ejection control device comprising:

an input unit configured to input image data;

an input buffer configured to store first image data inputted by the input unit, the first image data including the plurality of impressions;

a processing unit configured to produce second image data by subjecting the first image data to processing, the processing unit including a first processing unit configured to produce plain data by performing first processing in which extraction processing and/or command analysis is performed as the processing, and a second processing unit configured to produce the second image data by performing second processing including vertical-horizontal conversion processing on the plain data;

an output buffer configured to store the second image data; and a liquid ejection unit configured to eject the liquid so as to superpose the images respectively corresponding to the plurality of impressions on a target based on the second image data, the output buffer having a storage capacity that is capable of holding image data equivalent to at least two impressions out of the plurality of impressions, an intermediate buffer being provided to the liquid ejection control device to hold the plain data that has undergone the first processing by the first processing unit, the intermediate buffer having a storage capacity equivalent to at least two impressions.

12. A liquid ejection device comprising:

the liquid ejection control device according to claim 11;

a movement unit configured to relatively move the liquid ejection unit and the target; and a drive control unit configured to control the movement unit.

13. A liquid ejection control method comprising:

holding in an input buffer first image data inputted by an input unit;

subjecting the first image data held in the input buffer to processing to produce second image data, and holding the second image data in an output buffer;

forming an image by layering a plurality of impressions by ejecting liquid onto a target with a liquid ejection unit based on the second image data held in the output buffer, the output buffer having a storage capacity that is capable of holding image data equivalent to at least two out of the plurality of impressions; and allocating dynamically the storage capacity of the output buffer, the allocating of the storage capacity including allocating the blank pass to a buffer located upstream in a data flow direction with respect to the output buffer when, in the course of switching the image formed by liquid ejection of the liquid ejection unit, formation of the last image prior to the switch ends and results in a blank pass in the output buffer.

* * * * *